United States Patent
Conrad et al.

(10) Patent No.: US 7,185,109 B2
(45) Date of Patent: Feb. 27, 2007

(54) RECURSIVE DISCOVERY OF CDP TYPE OF NODES IN A NETWORK OF VARIOUS NODE TYPES

(75) Inventors: Jeffrey Richard Conrad, Fort Collins, CO (US); Tyler Grant Peterson, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 743 days.

(21) Appl. No.: 09/838,162

(22) Filed: Apr. 20, 2001

(65) Prior Publication Data
US 2002/0156920 A1 Oct. 24, 2002

(51) Int. Cl.
G06F 15/173 (2006.01)
H04L 12/28 (2006.01)
(52) U.S. Cl. .............. 709/242; 370/254; 370/266
(58) Field of Classification Search ............... 709/238, 709/242, 223–224, 220; 370/254
See application file for complete search history.

(56) References Cited

U.S. PATENT DOCUMENTS

| | | | |
|---|---|---|---|
| 5,185,860 A | 2/1993 | Wu | |
| 5,276,789 A | 1/1994 | Besaw et al. | |
| 5,627,766 A * | 5/1997 | Beaven | 702/122 |
| 5,796,736 A * | 8/1998 | Suzuki | 370/254 |
| 5,926,463 A * | 7/1999 | Ahearn et al. | 370/254 |
| 6,182,136 B1 | 1/2001 | Ramanathan et al. | |
| 2002/0133622 A1* | 9/2002 | Pinto | 709/242 |
| 2002/0165815 A1* | 11/2002 | Vincent | 705/37 |
| 2003/0156552 A1* | 8/2003 | Banker et al. | 370/266 |

OTHER PUBLICATIONS pp. 535-551 of Ross and Kurose, "Computer Networking: a Top-down Approach Featuring the Internet", Addison Wesley Longman, Inc., 2000.
Chapter 52 of "Simple Network Management Protocol (SNMP)—Internetworking Technology Overview", Cisco Systems, Inc., Jun. 1999, pp. 52-1-52-11.

* cited by examiner

Primary Examiner—Wen-Tai Lin
(74) Attorney, Agent, or Firm—Hewlett Packard Company (57) ABSTRACT

A method and system is disclosed for automatically discovering Cisco Discovery Protocol (CDP) nodes a network in real time. The discover process transmits a signal from a network manager to a first CDP node of the network. The signal requests information regarding additional CDP nodes known to the first node. The network manger receives a response is that identifies additional CDP nodes known to the first CDP node. The transmitting and receiving steps are then repeated for each additional CDP node identified. A list containing information of all identified nodes is then stored.

17 Claims, 6 Drawing Sheets

PRIOR ART

RECURSIVE DISCOVERY OF CDP TYPE OF NODES IN A NETWORK OF VARIOUS NODE TYPES

BACKGROUND OF THE INVENTION

1. Field of the Invention

The present invention relates to network management systems. Further, the present invention is directed to methods and systems that automatically discover nodes of a network, and in particular only the desired node types of the network.

2. Background Information

The ability manage networks efficiently is a necessity for institutions of all sizes. As technology continues to develop and be deployed to an increasing number of users and applications, networks become larger and more complex. Consequently, network management requires constant monitoring of the deployed nodes (i.e, computers, servers, routers, sub-networks, network enabled devices, and the like). The nodes may alternatively be referred to managed devices or node devices. Regardless of the term used, the node (or managed device or node device) refers to a piece of network equipment (including the equipment's software) that resides on a managed network. As part of the network monitoring process, the identity and quantity of deployed nodes should be identified.

The decentralization of computer networks has increased the complexity of tracking network topology. The network nodes may be linked in any one of a variety of schemes. Systems for determining and graphically displaying the topology of a computer network are known. U.S. Pat. No. 5,276,789 to Besaw et al. and U.S. Pat. No. 5,185,860 to Wu, both of which are assigned to the assignee of the present invention and are hereby incorporated by reference, describe such systems. As described in Besaw et al., the system retrieves a list of nodes and their interconnections from a database which can be manually built by a network administrator or automatically constructed using computer software. The system can be configured to provide any one of three views. An internet view shows nodes and interconnections of different networks. A network view shows the nodes and interconnections of a single network within the internet view. A segment view displays nodes connected within one segment of one of the networks. Selected nodes on the network, called discovery agents, can convey knowledge of the existence of other nodes. The network discovery system queries these discovery agents and obtains the information necessary to form a graphical display of the topology. The discovery agents can be periodically queried to determine if nodes have been added to the network. In a Transmission Controller Protocol/Internet Protocol (TCP/IP) network, the discovery agents are nodes that respond to queries for an address translation table which translates Internet Protocol (IP) addresses to physical addresses.

The Wu patent describes a system that operates on a TCP/IP network to using Simple Network Management Protocol (SNMP) to automatically discover nodes on the network. The Wu system makes use of the functionality of the SNMP protocol to query discovery agents on the network and thereby obtain a list of other nodes on the network known to the discovery agent. The system then uses this list to query other nodes in the list to find additional discovery agents among the list of other nodes. The process is repeated to automatically discover the nodes on the network. Additionally, the system repeats the process at timed intervals to identify nodes that were not available during previous the discovery process.

Figure 1:
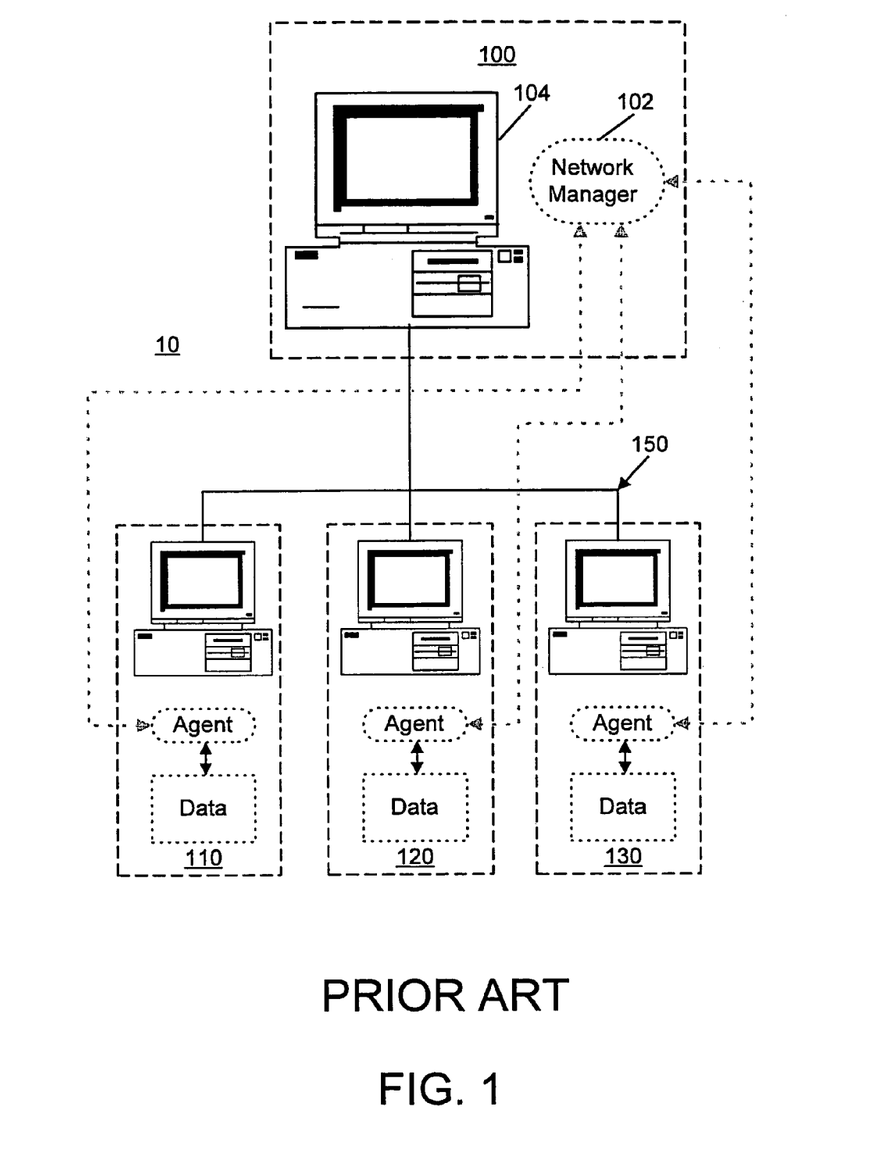
FIG. 1 shows a typical system for SNMP based network management.

FIG. 1 shows a typical managed network 10 that can use SNMP to manage the and discover nodes on the network 10. A network management system 100 comprises a network manager 102 and a computer 104. The network management system is connected via interconnection 150 (e.g., copper wire, fiber optics, coaxial cable, wireless, and the like) to various nodes 110–130. Each node 110–130 contains an agent that communicates with the network manager 102. Although the actual data between the nodes 110–130 and the network manager 102 is transmitted over the interconnection 150, a protocol (e.g., SNMP) is necessary to communicate between the network manager 102 and the agents of nodes 110–130. The SNMP connections are shown as dashed lines between the agents and network manager 102. For example, the network manager 102 can query the agent in node 110 using SNMP. The agent then obtains the necessary data from node 110. Then, the agent of node 110 returns its response to the query to the network manager 102. Typically, the data is organized in a Management Information Base (MIB). Additional information regarding SNMP and MIB can be found in pages 535–551 of Ross and Kurose, "Computer Networking: a Top-down Approach Featuring the Internet", Addison Wesley Longman, Inc., 2000, and Chapter 52 of "Internetworking Technology Overview", Cisco Systems, Inc., June 1999, which both are incorporated herein by reference.

Another patent assigned to the assignee of the present invention, U.S. Pat. No. 6,182,136 to Ramanathan et al., which is hereby incorporated by reference, is directed to the automatic discovery of service elements. The system uses a discovery template in combination with a discovery engine to drive the discovery routines. The discovery template includes data that triggers selected discovery routines for acquiring information that identifies services and service elements that are anticipated as being cooperative in the execution of core services (e.g., email access, web access, Virtual Private Networks). The system uses the information obtained to create a map of the dependencies of among the actual services (e.g., web access) and actual service elements (e.g., Network File System and Domain Name Service server) within the network.

Although it is known to automatically discover managed devices, prior node discovery systems have aggregated and retrieved information regarding all neighboring nodes. Large and complex networks will have several layers of nodes and many different node types. Thus, a general discovery of all these nodes can delay or prevent the network manager from obtaining information on the desired node types. Therefore, it is desired to provide a network management system that discovers only the desired node types of a network using standard SNMP messages.

SUMMARY OF THE INVENTION

The present invention is generally directed to method and systems for discovering Cisco Discovery Protocol (CDP) nodes of the network. The present invention overcomes the prior art limitations by discovering CDP nodes in a network in real time by transmitting a signal (e.g., an SNMP message) from a network manager to a first CDP node of the network. The signal requests information regarding additional CDP nodes known to the first node. The network manger receives a response that identifies additional CDP nodes known to the first CDP node, referred to as CDP neighbors. The transmitting and receiving steps are then repeated for each additional CDP node identified. A list containing addresses of all identified nodes is then stored.

In another embodiment, the depth of the search for additional CDP nodes is limited by establishing a recursion depth limit. The depth of recursion into the network from the first CDP node is tracked. When the depth of recursion equals the recursion depth limit, additional signals are prevented from being transmitted to newly discovered nodes.

In yet another embodiment, the breadth of the search for additional CDP nodes by establishing a maximum hop limit. The number of hops from the first CDP node is tracked. When the number of hops equals the maximum hop limit, additional signals are prevented from being transmitted to newly discovered nodes.

In still yet another embodiment, a method for discovering CDP nodes in a network comprises transmitting a SNMP message from a network manager to a first CDP node of the network to obtain information from the first CDP node; recursively transmitting a SNMP message to at least one additional CDP node of the network identified to the network manager by the information obtained from the first CDP node; and storing a list containing information of all identified CDP nodes.

BRIEF DESCRIPTION OF THE DRAWINGS

The above features and advantages of the invention, and additional features and advantages of the invention, will be better appreciated from the following detailed description of the invention made with reference to the drawings, wherein like elements in the drawings have the same reference number and, wherein.

DETAILED DESCRIPTION OF THE PREFERRED EMBODIMENTS

The Cisco Discovery Protocol (CDP) is an example of a protocol for discovering devices on a network. Each CDP device sends periodic messages to a multicast address (i.e., a node that can broadcast the information to multiple nodes). Devices discover each other by listening at the multicast address. Then, a local cache with information about these devices is built. A Cisco Discovery Protocol Management Information Base (CDP MIB) is a collection of information about a CDP node that is organized in a hierarchical manner. Specific information regarding the CDP MIB can be found in chapter 5 of "FastHub 300 Series MIB Reference Manual", Cisco Systems, which is hereby incorporated by reference.

Figure 2:
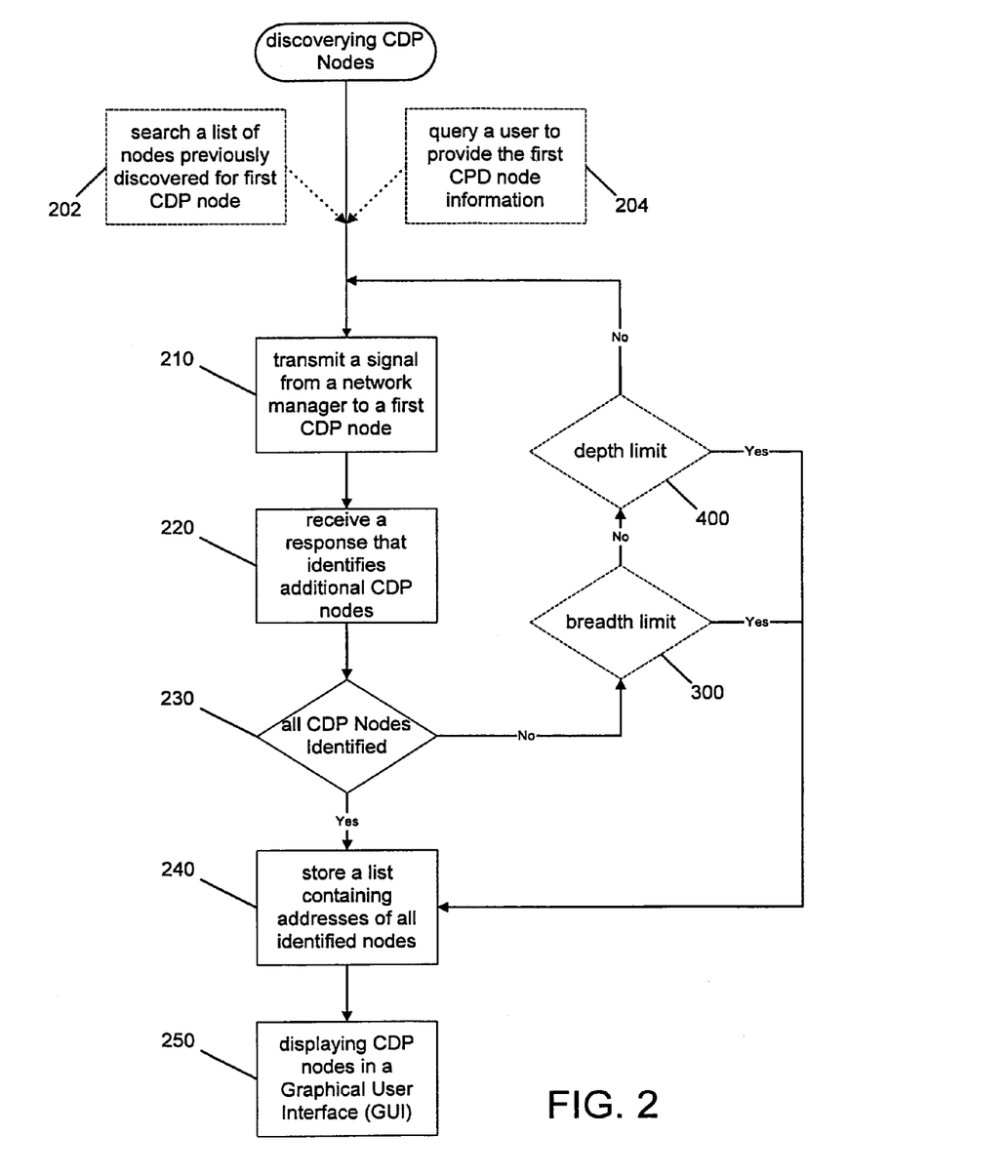
FIG. 2 shows a flow chart of an exemplary method of the present invention.
Figure 5:
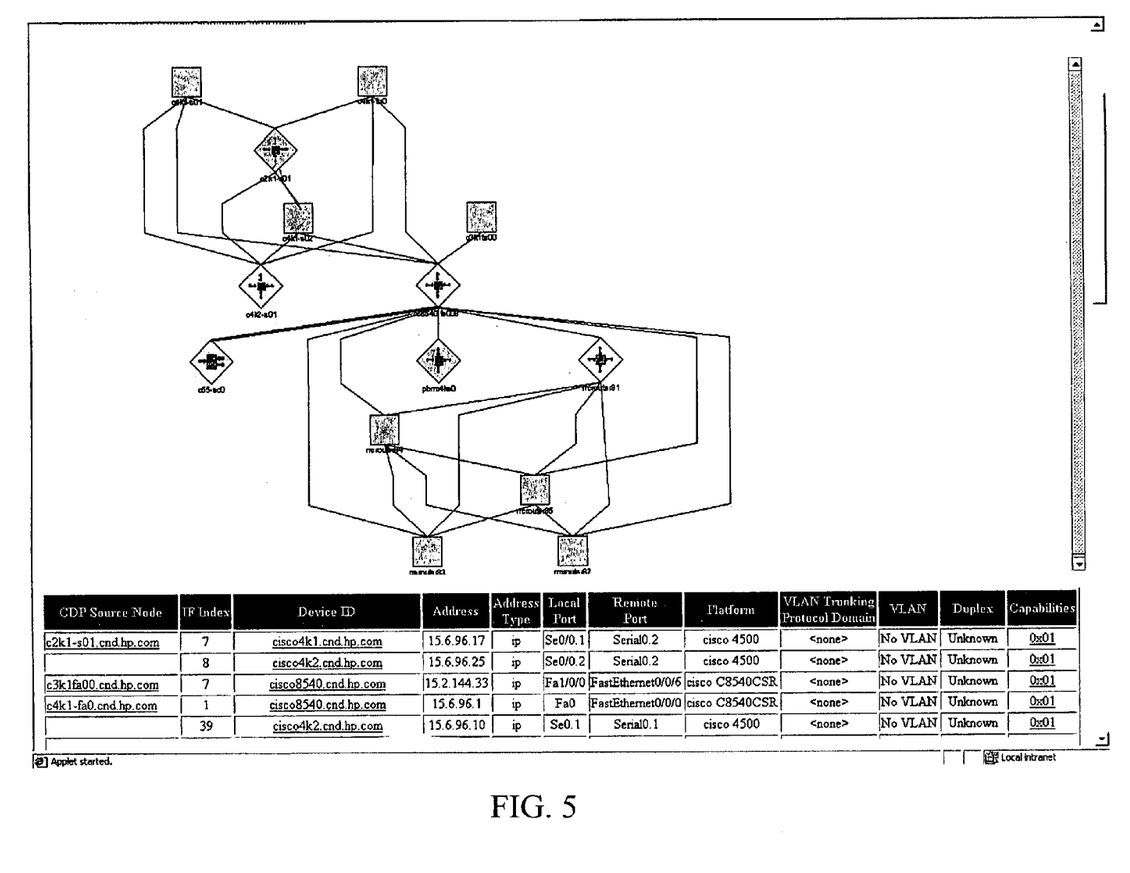
FIG. 5 illustrates a screen capture of a display of data obtained by the present invention.

FIG. 2 shows a flow chart of an exemplary method for discovering CDP nodes in a network. The discovery process starts, in step 210, by transmitting a signal from a network manager to a first CDP node of the network. The signal is a SNMP message that accesses the CDP MIB of the first CDP node. The CDP MIB contains valuable information about the node and also information of other neighboring CDP nodes on the network. The signal requests information regarding the additional CDP nodes known to the first node. In step 220, the network manager receives a response that identifies additional CDP nodes known to the first CDP node. The transmitting and receiving steps are then repeated for each additional CDP node identified, in step 230. A list containing addresses of all identified nodes is then stored, in step 240. Those skilled in the art will appreciate that the list may contain additional information, such as the interrelation of the identified nodes, device identification, device type (e.g., router, hub, bridge, etc.), and the like. Further, those skilled in the art will appreciate that each additional node discovered may contain references to previously discovered nodes because of a typical network interconnections. Although this information on the interrelationship of the nodes is useful for purposes of determining the topology of the network, only newly identified nodes need to be further interrogated. In step 250, this information is used to display the CDP nodes in a Graphical User Interface (GUI). FIG. 5 illustrates an example of the CDP nodes displayed on a GUI. The specific aspects of the displayed information will be discussed later Those skilled in skilled in the art will appreciate that the communication process is similar to that described in relation to FIG. 1. Thus, the CDP nodes can be discovered using standard SNMP messages without having to use proprietary commands or additional hardware. By using standard SNMP messages to discover the CDP nodes, the invention is not dependent on specific proprietary routines to access the desired data. Therefore, internal software revisions at each node will not effect the inventions ability to identify that node and access its desired data.

Optionally, the discovery process may be seeded by either a user input or from previously identified nodes. In step 204, the discovery process is seeded by having a user provide the address information of the first CDP node for the process to start from. This allows the user to start the process at a specific portion of the network, which can speed the discovery of desired portions of the network. The network manager will typically have some alternative discovery capabilities, such as a general discovery process that identifies all nodes. Therefore, the discovery process can alternatively be seeded, in step 202, by searching a list containing previously discovered nodes to identify a CDP node and then obtain the address information of that node to use as the first CDP node. However, if the CDP discovery process has been previously performed, a CDP node from the list can be used as the first CDP node.

Figure 3:
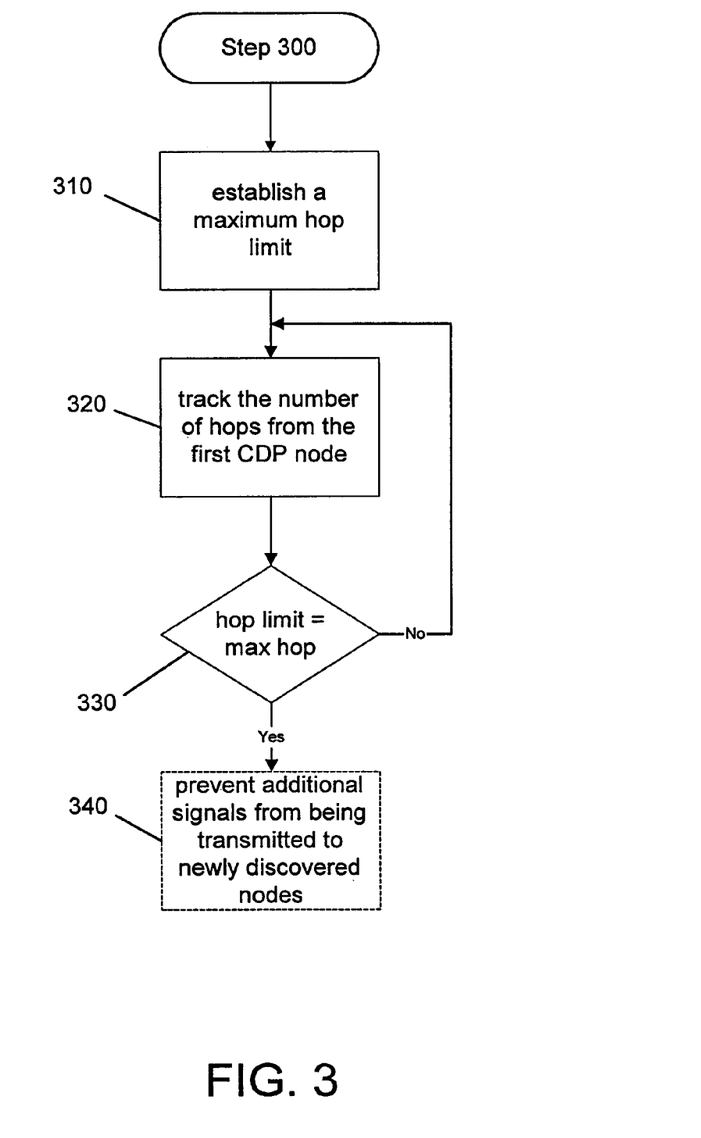
FIG. 3 shows a flow chart of details of a limited breadth search.

Optionally, the breadth of the search for additional CDP nodes is limited, in step 300. FIG. 3 shows a flow chart for limiting the breadth of the CDP node search. In step 310, a limit is set by establishing a maximum hop limit (i.e., the number of additional nodes that will be identified). In step 320, the number of hops from the first CDP node is tracked. In step 330, the number of hops is compared to the maximum hop limit. When the number of hops equals the maximum hop limit, additional signals are prevented from being transmitted to newly discovered nodes, in step 340.

Figure 4:
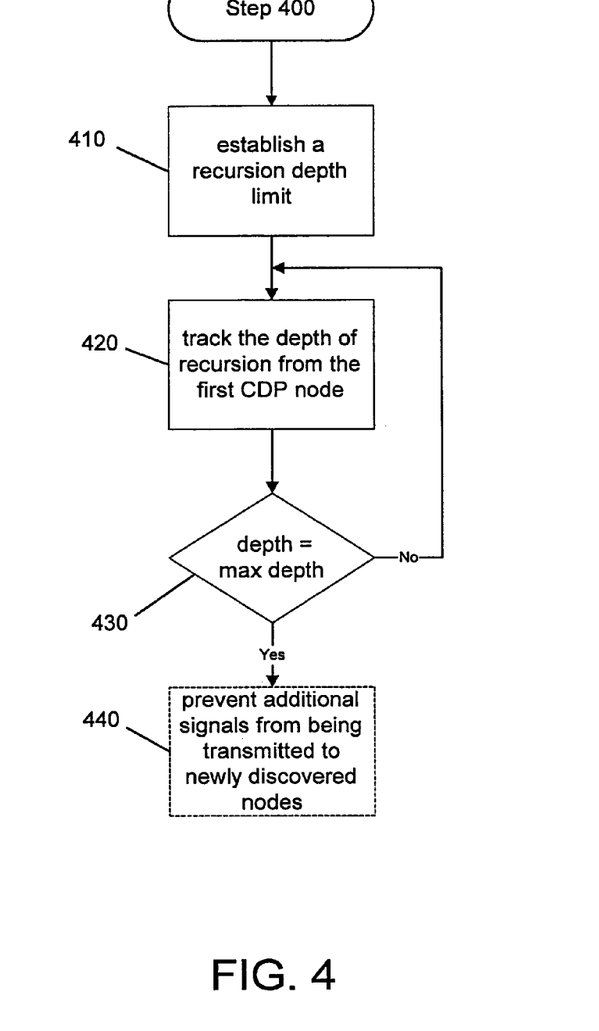
FIG. 4 shows a flow chart of details of a limited depth search.

Further, the depth of the search for additional CDP nodes can optionally be limited in step 400. FIG. 4 shows flow chart for limiting the depth of the CDP node search. In step 410, a limit is set by establishing a recursion depth limit. In step 420, the depth of recursion from the first CDP node is tracked. In step 430, the depth of recursion is compared to the recursion depth limit. When the depth of recursion equals the recursion depth limit, additional signals are prevented from being transmitted to newly discovered nodes, in step 440.

Since networks can be very large, the ability to limit the number of hops and depth of recursion allows the process run time to be controlled. Additionally, since the process is performed in real time limiting the recursion depth allows the process to rapidly map the extent of the network relative to CDP nodes. For example, the discovery process can be performed based upon a user's request. If the depth of recursion is limited to a small number, only the CDP nodes most closely connected to the user entered first CDP node will be displayed. Therefore, the list can be modified in real time to facilitate real time display of the identified CDP nodes as each CDP node is identified. The real time display can be presented to the user as a graphical topology of the network. Alternatively, the discovery process can be performed at fixed time intervals to generate lists at fixed time. These lists can be archived used for network monitoring and reporting.

FIG. 5 illustrates a sample screen capture of a report generated from the list of CDP nodes obtained by the present invention. The report was generated by Network Node Manager™ (NNM), which is available from Hewlett-Packard and which is an exemplary network manger that can be used in accordance with the present invention. The NNM provides the user interface and graphic topology displays that advantageously use the list of CDP nodes generated by the present invention. The complexity of a typical network topology is shown in FIG. 5 in the top window of the screen capture. The bottom window shows an example of the list of CDP nodes generated by the present invention. Information regarding each node discovered including the source node (e.g., the first CDP node) and nodes that depend from that node (e.g., the additional nodes known to the first node) is displayed. Additionally, device ID, address, and other data obtained regarding the node are displayed.

To facilitate an understanding of the invention, many aspects of the invention are described in terms of sequences of actions to be performed by elements of a computer-based system. It will be recognized that in each of the embodiments, the various actions can be performed by specialized circuits (e.g., discrete logic gates interconnected to perform a specialized function), by program instructions being executed by one or more processors, or by a combination of both. Moreover, the invention can additionally be considered to be embodied entirely within any form of a computer readable storage medium having stored therein an appropriate set of computer instructions that would cause a processor to carry out the techniques described herein. Thus, the various aspects of the invention can be embodied in many different forms, and all such forms are contemplated to be within the scope of the invention. For each of the various aspects of the invention, any such form of an embodiment is referred to herein as "logic that" performs a described action.

Figure 6:
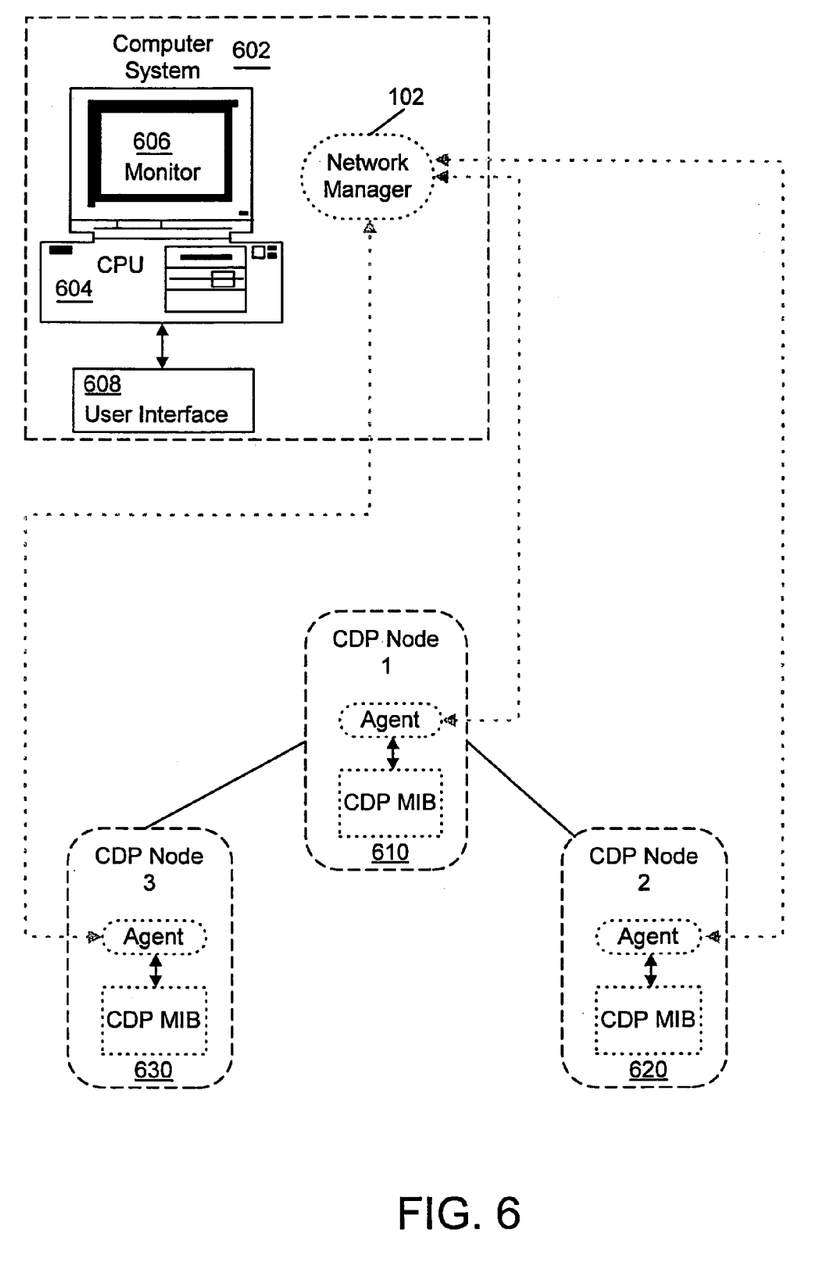
FIG. 6 illustrates an exemplary computer-based system for managing a network.

FIG. 6 illustrates an exemplary computer-based system 602 for managing a network. The computer-based system 602 includes logic that transmits a signal from a network manager 102 to a first CDP node 610 of the network, wherein the signal requests information regarding additional CDP nodes, 620 and 630, known to the first node 610. The computer-based system 602 also includes logic that receives a response that identifies the additional CDP nodes, 620 and 630, known to the first CDP node 610 and logic that repeats the transmitting and receiving steps for each additional CDP node, 620 and 630, identified. Logic that stores a list containing addresses of all identified CDP nodes is also included in the computer-based system.

Preferably, the computer-based system 602 comprises a monitor 606, a processing unit 604, a user interface 608 and an integrated network interface device. Examples of suitable computer-based systems include, but are not limited to, Hewlett Packard 9000 servers and workstations, Sun-SPARC, Ultra Servers and Workstations, and Intel based personal computers. One skilled in the art with appreciate that any computer-based system that can connect to a network is suitable to practice the invention.

The foregoing has described principles, preferred embodiments and modes of operation of the invention. However, the invention is not limited to the particular embodiments discussed above. Therefore, the above-described embodiments should be regarded as illustrative rather than restrictive, and it should be appreciated that variations may be made in those embodiments by those skilled in the art, without departing from the scope of the invention as defined by the following claims.

What is claimed is:

1. A method of discovering Cisco Discovery Protocol (CDP) nodes in a network of nodes of various types in real time resulting in a set of CDP type of nodes, comprising:
   seeding a discovery process using at least one of querying a user to provide a first CDP node information and searching a database of CDP nodes previously discovered by a network manager to identify a first CDP node;
   transmitting a signal from the network manager to the first CDP node of the network, wherein the signal requests information contained in a management information base of the first CDP node regarding additional CDP nodes known to the first CDP node;
   receiving a response that identifies the additional CDP nodes known to the first CDP node;
   repeating the transmitting and receiving steps for each additional CDP node identified; and
   storing a list containing addresses of all identified nodes of the CDP type for a selected display pertaining to the identified CDP nodes among the nodes of various types in the network wherein the first CDP node can be any of the CDP type of nodes within the network.

2. The method of claim 1, wherein each signal is an SNMP message.

3. The method of claim 1, further comprising:
   limiting a depth of a search for additional CDP nodes.

4. The method of claim 3, wherein limiting the depth of the search comprises:
   establishing a recursion depth limit;
   tracking the depth of recursion into the network from the first CDP node; and
   preventing any additional signals from being transmitted to newly discovered CDP nodes once the depth of recursion equals the recursion depth limit.

5. The method of claim 1, further comprising:
   limiting a breadth of a search for additional CDP nodes.

6. The method of claim 5, wherein limiting the breadth of the search comprises:
   establishing a maximum hop limit;
   tracking a number of hops from the first CDP node; and
   preventing any additional signals from being transmitted to newly discovered CDP nodes once the number of hops equals the maximum hop limit.

7. The method of claim 1, further comprising:
   limiting a breadth and a depth of a search for the additional CDP nodes.

8. The method of claim 1, further comprising:
performing the discovery process based upon a user's request or at fixed time intervals.

9. The method of claim 1, further comprising:
displaying the identified CDP nodes in a Graphical User Interface.

10. The method of claim 1, further comprising:
modifying the list in real time to facilitate real time display of identified CDP nodes as each CDP node is identified, wherein the real time display is presented as a graphical topology of the network on a Graphical User Interface.

11. The method of claim 1, wherein the network manager is Network Node Manager.

12. The method of claim 1, wherein the list further comprises at least one of information on the interrelation of the identified CDP nodes, device identification information, and device type information.

13. A method for discovering Cisco Discovery Protocol (CDP) nodes in a network of nodes of various types in real time resulting in a set of CDP type of nodes, comprising:
seeding a discovery process using at least one of querying a user to provide a first CDP node information and searching a database of CDP nodes previously discovered by a network manager to identify a first CDP node;
transmitting a SNMP message from the network manager to the first CDP node of the network to obtain information contained in a management information base of the first CDP node;
recursively transmitting a SNMP message to at least one additional CDP node of the network identified to the network manager by the information obtained from the first CDP node; and
storing a list containing information of all identified nodes of the CDP type for a selected display pertaining to the identified CDP nodes among the nodes of various types in the network wherein the first CDP node can be any of the CDP type of nodes within the network.

14. A computer-based system that discovers Cisco Discovery Protocol (CDP) nodes in a network of nodes of various types in real time resulting in a set of CDP type of nodes, comprising:

logic that seeds a discovery process using at least one of querying a user to provide a first CDP node information and searching a database of CDP nodes previously discovered by a network manager to identify a first CDP node;
logic that transmits a signal from the network manager to the first CDP node of the network, wherein the signal requests information contained in a management information base of the first CDP node regarding additional CDP nodes known to the first CDP node;
logic that receives a response that identifies the additional CDP nodes known to the first CDP node;
logic that repeats the transmitting and receiving steps for each additional CDP node identified; and
logic that stores a list containing addresses of all identified nodes of the CDP type for a selected display pertaining to the identified CDP nodes among the nodes of various types in the network wherein the first CDP node can be any of the CDP type of nodes within the network.

15. The computer-based system of claim 14, further comprising:
logic that limits a depth and a breadth of a search for additional CDP nodes.

16. The computer-based system of claim 15, wherein limiting the depth of the search comprises:
logic that establishes a recursion depth limit;
logic that tracks the depth of recursion into the network from the first CDP node; and
logic that prevents any additional signals from being transmitted to newly discovered CDP nodes once the depth of recursion equals the recursion depth limit.

17. The computer-based system of claim 15, wherein limiting the breadth of the search comprises:
logic that establishes a maximum hop limit;
logic that tracks a number of hops from the first CDP node; and
logic that prevents any additional signals from being transmitted to newly discovered CDP nodes once the number of hops equals the maximum hop limit.

* * * * *